(12) United States Patent
Locke

(10) Patent No.: US 9,227,539 B2
(45) Date of Patent: Jan. 5, 2016

(54) PORTABLE PADDED ARMREST

(71) Applicant: Grady Locke, Oklahoma City, OK (US)

(72) Inventor: Grady Locke, Oklahoma City, OK (US)

(\*) Notice: Subject to any disclaimer, the term of this patent is extended or adjusted under 35 U.S.C. 154(b) by 0 days.

(21) Appl. No.: 14/503,759

(22) Filed: Oct. 1, 2014

(65) Prior Publication Data

US 2015/0097392 A1     Apr. 9, 2015

Related U.S. Application Data

(60) Provisional application No. 61/886,197, filed on Oct. 3, 2013.

(51) Int. Cl.
*B60N 2/46*     (2006.01)

(52) U.S. Cl.
CPC .............. *B60N 2/4673* (2013.01); *B60N 2/466* (2013.01)

(58) Field of Classification Search
CPC .............................. B60N 2/4673; B60J 5/0493
USPC ................ 297/411.21, 411.22; 296/153, 1.09
See application file for complete search history.

(56) References Cited

U.S. PATENT DOCUMENTS

| 2,633,186 | A  | * | 3/1953  | Jeckell ........................... 297/227 |
| 3,310,339 | A  | * | 3/1967  | Stanley .......................... 296/153 |
| 5,692,711 | A  | * | 12/1997 | Tucker ........................... 248/118 |
| 5,893,601 | A  | * | 4/1999  | Carlberg ......................... 296/153 |
| 6,695,387 | B1 | * | 2/2004  | Gordon ........................... 296/153 |
| 6,981,735 | B1 | * | 1/2006  | Stephens ......................... 296/153 |
| 2004/0017094 | A1 | * | 1/2004 | Bruton ........................... 296/153 |
| 2007/0024085 | A1 | * | 2/2007 | Steelman ........................ 296/153 |
| 2009/0315381 | A1 | * | 12/2009 | Longnecker ............. 297/411.23 |

\* cited by examiner

*Primary Examiner* — Jason S Morrow
(74) *Attorney, Agent, or Firm* — Gregory K. Goshorn; Greg Goshorn, P.C.

(57) ABSTRACT

Provided is a portable armrest for use with vehicles. The device includes a moldable, high density foam forming a planar surface and a base attached. The device is mounted to a door panel by a sliding or snapping mechanism for quick installation. When installed, the device allows a user to rest his or her arm on the device while driving in a vehicle. The device provides a comfortable place for drivers and passengers to rest their arm and prevents drivers from constantly shifting positions and becoming distracted. The device inserts into the existing molded pull cup on a vehicle's door panel. The device encourages drivers to sit in an upright position by slightly elevating their arm and accommodates most vehicles for maximum convenience and functionality.

12 Claims, 3 Drawing Sheets

PORTABLE PADDED ARMREST

CROSS-REFERENCES TO RELATED APPLICATIONS

The present application claims the benefit of the filing date of a provisional application entitled, "Portable Padded Armrest" Ser. No. 61/886,197, filed Oct. 3, 2013 and herein incorporated by reference.

FIELD OF THE DISCLOSURE

The claimed subject matter relates generally to a vehicle accessory and, more specifically, to a padded, removable armrest for insertion into a door of a vehicle.

BACKGROUND

Most vehicles provide an armrest on the doors for the comfort of both drivers and passengers. The actual comfort of these existing armrests may be minimal. Devices are known in the prior art that relate to vehicle armrests. Some of these patents describe a mountable armrest for a vehicle doorframe. Other patents disclose a removable armrest for automobiles with removable tops and windows.

SUMMARY

Provided is a portable armrest for use with vehicles. The device includes a moldable, high impact material forming a planar surface and a base attached. The device is mounted to a door panel by a sliding or snapping mechanism for quick installation. When installed, the device allows a user to rest his or her arm on the device while driving in a vehicle. The device provides a comfortable place for drivers and passengers to rest their arm and prevents drivers from constantly shifting positions and becoming distracted. The device inserts into the existing molded pull cup on a vehicle's door panel. The device encourages drivers to sit in an upright position by slightly elevating their arm and accommodates most vehicles for maximum convenience and functionality.

Provided is a portable armrest that includes a moldable, high impact material forming a planar surface with a base attached. A protrusion coupled on the base enables the armrest to be mounted to a door panel by a sliding or snapping mechanism for quick installation.

Provided is an apparatus, comprising an armrest base; an armrest padding coupled to the armrest base; and a protrusion coupled to the armrest base configured to fit into an armrest pull cup of an existing armrest of a door of a vehicle and to secure the apparatus to the existing armrest. The apparatus may include a removable decorative cover for protection of the armrest base.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures.

DETAILED DESCRIPTION OF THE FIGURES

As the Inventor herein has realized, existing armrests in vehicles are typically not particularly comfortable. As a result, people must constantly shift around in their seat to find an acceptable position. Unfortunately, this can be both distracting and dangerous, especially for drivers. Additionally, both drivers and passengers can experience bodily fatigue after only a short amount of time without a place to properly elevate their arm.

Figure 1:
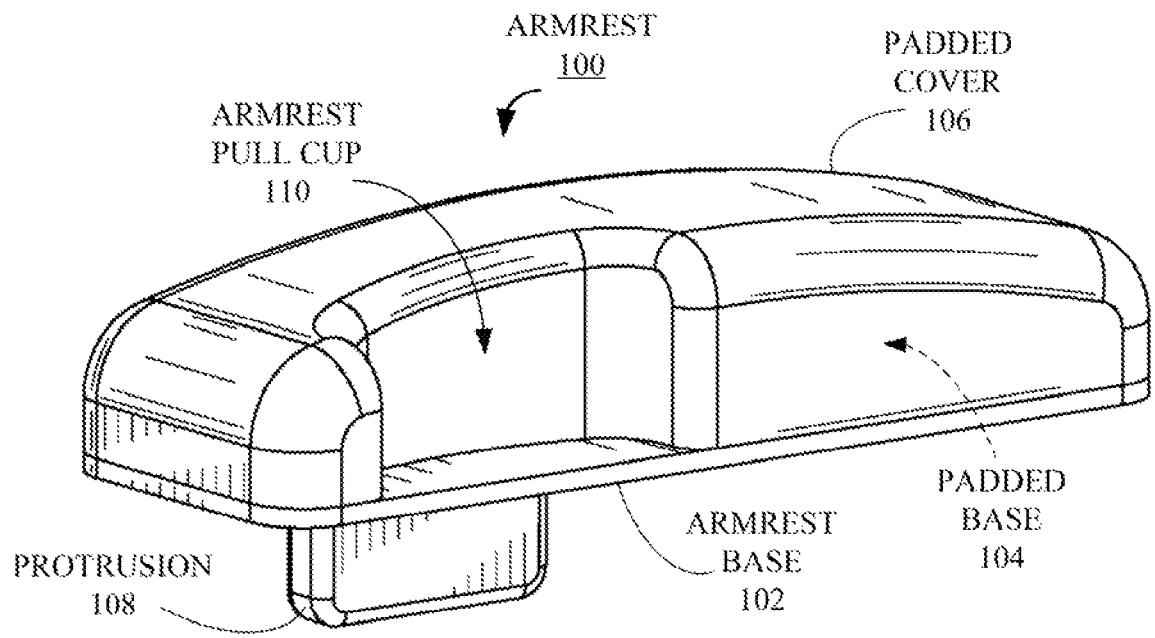
FIG. 1 shows a view of an armrest in accordance with the claimed subject matter.

Turning now to the figures, FIG. 1 illustrates a side view of an armrest 100 provided in accordance with the claimed subject matter. Armrest 100 includes an armrest base 102 that attaches to a cushioned or padded base 104. The dotted line pointing to padded base 104 indicates that padded base 104 is not actually visible when viewing armrest 100 because it is enclosed in a padded cover 106. A protrusion 108 coupled to armrest base 102 fits snugly into a door pull cup (see 114, FIG. 3) to secure armrest 100 to an existing armrest (see 112, FIG. 3) on the inside of a door (see 118, FIG. 3) of a vehicle (see 120, FIG. 3). Padded base 104 is attached and secured to base 102 of the armrest 100. Armrest 100 may also include an armrest pull cup 110.

Armrest base 102 may be constructed from high-impact plastic or other suitable material. Armrest padding 104 may be constructed of a moldable plastic, foam or other suitable material. Padded base 104 may also be a padded material, such as high-density foam for maximum comfort. As mentioned above, a top of armrest 100 may include a cover 106, which may be constructed of plastic, fabric, leather or any other suitable material. Padded cover 106 may be offered in a wide variety of designs that may complement the interior of a vehicle. Before use, armrest base 102 and padded base 104 may be secured together with corresponding snapping mechanisms or a variety of other means that should be familiar to those with skill in the relevant arts. In this manner, users are able to replace one or both padding base 104 and padded cover 106 if either or both wear out over time.

Figure 2:
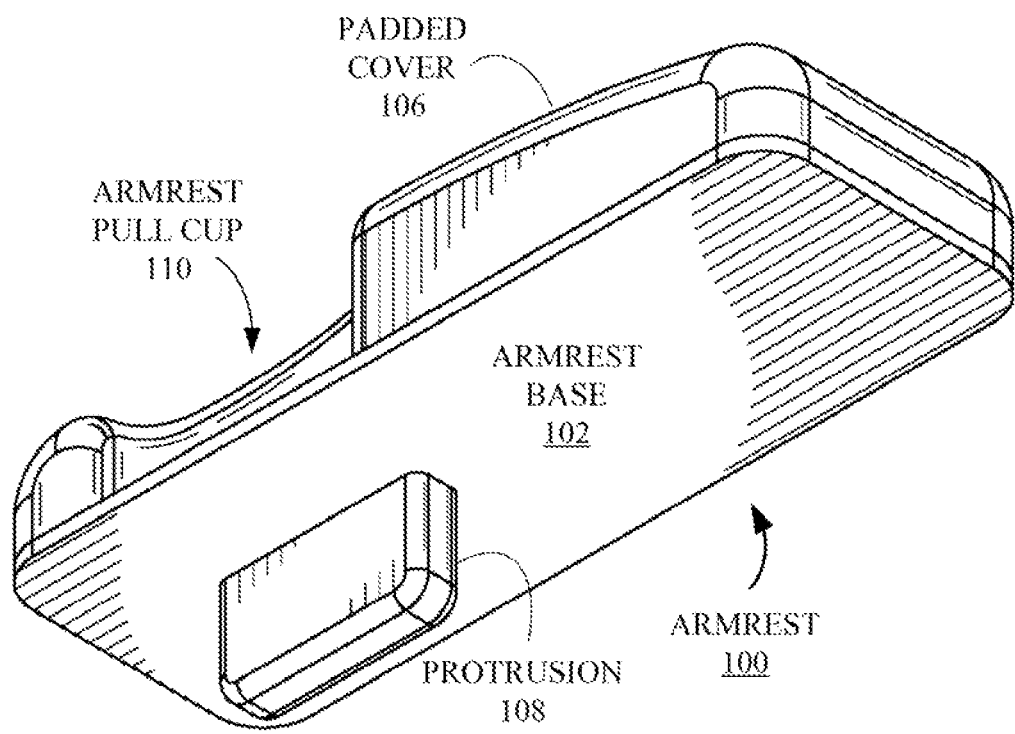
FIG. 2 shows the armrest, first introduced in FIG. 1, from a different angle.

FIG. 2 illustrates armrest 100, first introduced in conjunction with FIG. 1, from a different angle. Like in FIG. 1, armrest 100 includes a moldable, high impact material forming a planar surface, or padded base 106, base 102 and protrusion 108. Armrest 100 is mounted to a door panel (see 116, FIG. 3) by a sliding or snapping mechanism for quick installation. When installed, armrest 100 allows a user (see 122, FIG. 4) to rest his or her arm (see 124, FIG. 4).

Figure 3:
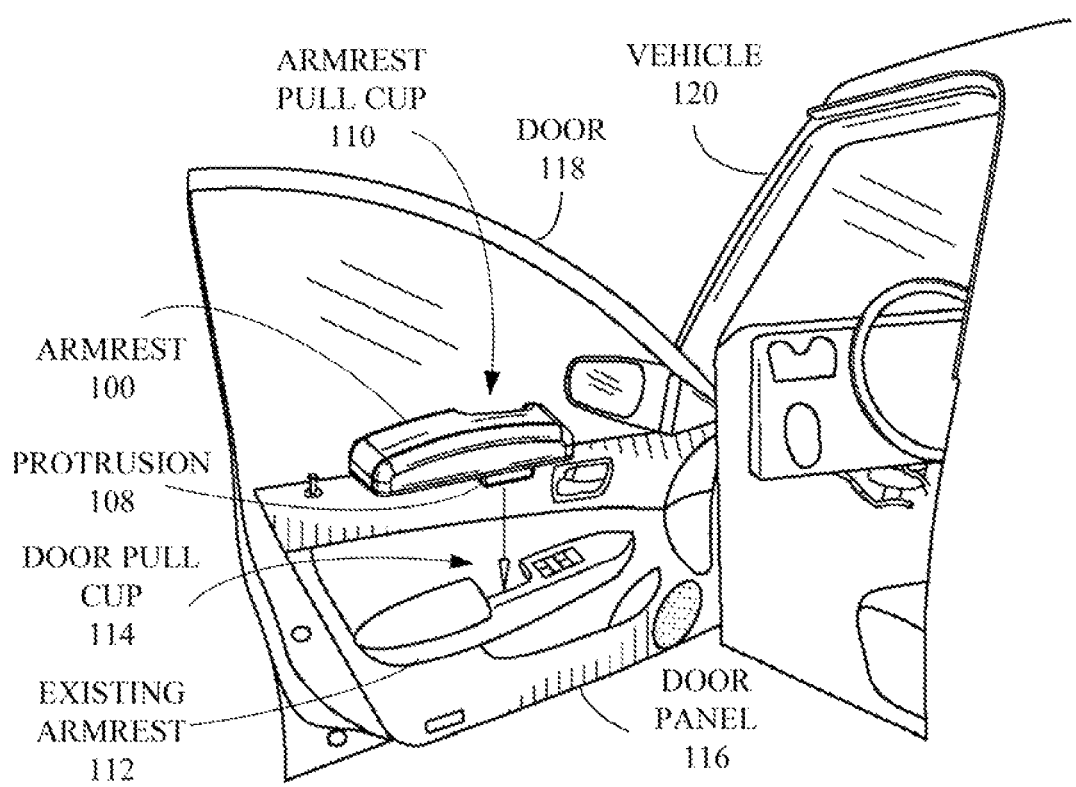
FIG. 3 illustrates how a protrusion on the bottom of the armrest and armrest base of FIGS. 1 and 2 fits into an existing door pull cup of a vehicle.
Figure 4:
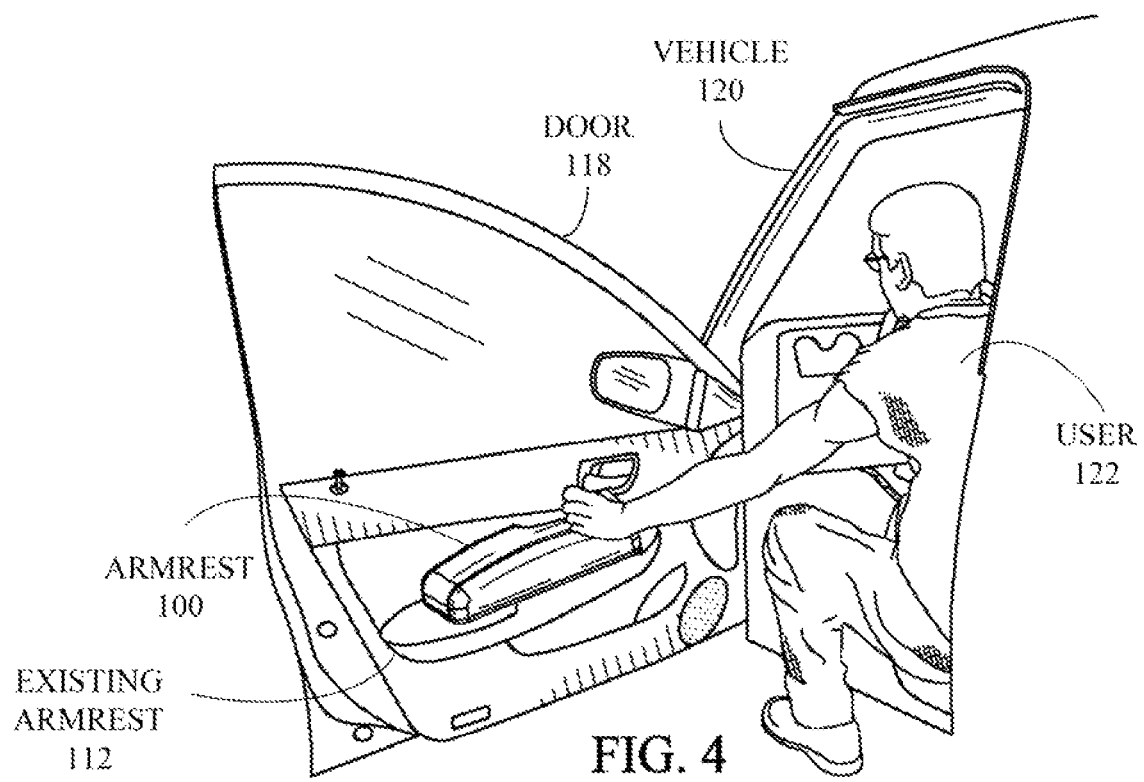
FIG. 4 illustrates a user employing the armrest in place of an existing armrest in a vehicle to move a door.

FIG. 3 illustrates how protrusion 108 (FIGS. 1 and 2) on the bottom of armrest base 102 (not seen in this Fig.) fits into a door pull cup 114 of an existing armrest 112 in a door panel 116 inside a door 118 of a vehicle 120. As explained above in conjunction with FIGS. 1 and 2, a protruding knob, or protrusion 108, extends from underneath armrest 100. Protrusion 108 fits into door pull cup 114 of door panel 116 of door 118 in vehicle 120 to secure armrest 100 in a fixed position. Armrest 100 includes an elongated firm material, or base 102, and a cushion, or padded cover 106, installed on padded base 104 of armrest 100, that provides a planar surface for the comfort of a user (see 122, FIGS. 4 and 6). The shape and size of armrest 100 and protrusion 108 may be changed for a snug fit into different armrests, such as door pull cup 114, of different vehicles. Armrest 100 is mounted to door panel 116 by a sliding or snapping mechanism (not shown) for quick installation FIG. 4 illustrates a user 122 employing armrest. 100, secured in existing armrest 112 (FIG. 3) in vehicle 120 (FIG. 3), to move door 118 (FIG. 3). Door 118 may be either opened or closed in such a manner.

Figure 5:
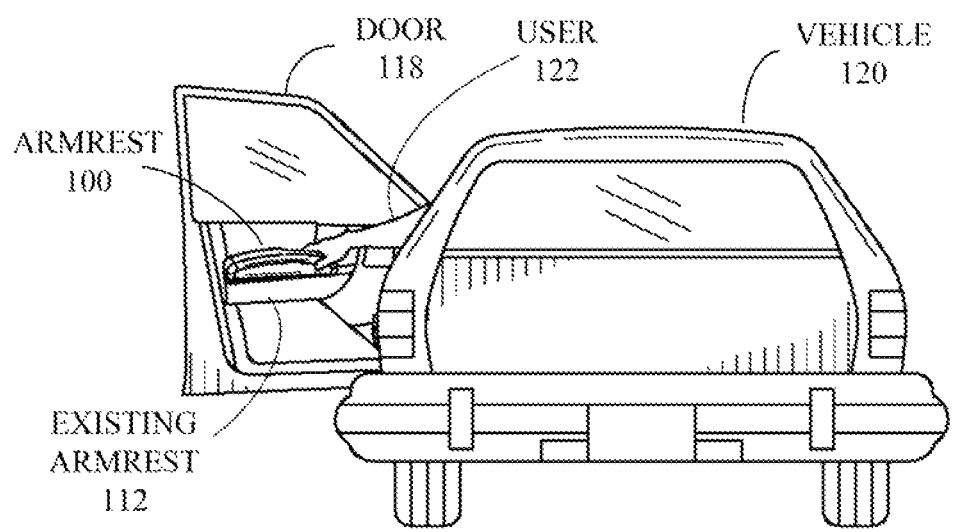
FIG. 5 illustrates a user employing an installed armrest to pull the door of a vehicle closed.

FIG. 5 shows another view of armrest 100, secured in existing armrest 112 of door 118. Like FIG. 4, in this illustration user 122 is employing armrest 100 to move door 118 by gripping armrest pull cup 110 (FIGS. 1 and 2).

Figure 6:
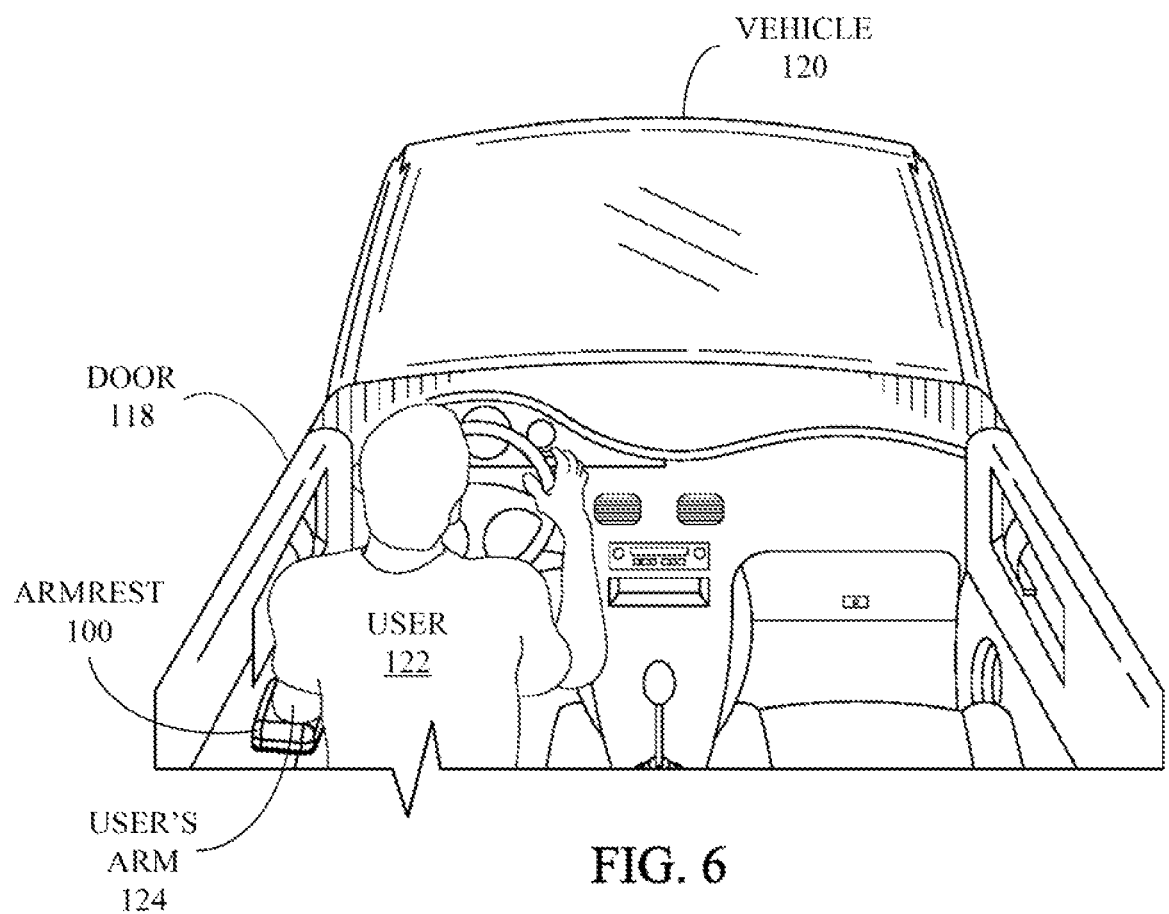
FIG. 6 illustrates the claimed armrest installed in a vehicle with a driver resting his arm on the armrest.

FIG. 6 shows user 122 sitting in vehicle 120. Armrest 100 is installed in door 118, such as in FIG. 5, and user's arm 124 is resting on armrest 100. Armrest 100 provides user 122 with a comfortable place to rest arm 124. Armrest 100 may be configured to install in either driver and passenger doors. Armrest 100 may thus be employed by both drivers and passengers traveling in vehicle 120. Armrest 100 may also be installed in or removed from door 118 in seconds without modification or altering vehicle 120 configurations, including door 118, door panel 116 (FIG. 3) and existing armrest 112 (FIGS. 3-5).

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

I claim:

1. An apparatus, comprising:
    an armrest base;
    an armrest padding coupled to the armrest base;
    a protrusion coupled to the armrest base that fits into an armrest pull cup of an existing armrest of a door of a vehicle and secures the apparatus to the existing armrest such that the protrusion prevents lateral movement of the armrest base with respect to the armrest pull cup,
    wherein the armrest padding is shaped to provide a second armrest pull cup within the apparatus, wherein the second armrest pull cup is configured to enable a user to manipulate the door with the armrest secured to the existing armrest.

2. The apparatus of claim 1, further comprising a removable cover that covers the armrest padding.

3. The apparatus of claim 2, wherein the removable cover is decorative.

4. The apparatus of claim 1, wherein the armrest base and armrest padding are removably coupled to each other.

5. The apparatus of claim 1, the armrest base comprising high impact material.

6. The apparatus of claim 1, the armrest padding comprising moldable, high-density foam.

7. A removable armrest for use in a vehicle, comprising:
    a rigid base;
    an armrest padding coupled to the rigid base;
    a protrusion coupled to the rigid base configured that fits into an armrest pull cup of an existing armrest of a door of a vehicle and secures the apparatus to the existing armrest such that the protrusion prevents lateral movement of the rigid base with respect to the armrest pull cup,
    wherein the armrest padding is shaped to provide a second armrest pull cup within the apparatus, wherein the second armrest pull cup is configured to enable a user to manipulate the door with the armrest secured to the existing armrest.

8. The armrest of claim 7, further comprising a removable cover that covers the armrest padding.

9. The armrest of claim 8, wherein the removable cover is decorative.

10. The armrest of claim 7, wherein the rigid base and armrest padding are removably coupled to each other.

11. The armrest of claim 7, the rigid base comprising high impact material.

12. The armrest of claim 7, the armrest padding comprising moldable, high-density foam.

* * * * *